March 10, 1959 J. S. MACKAY 2,877,086
PROCESS OF REMOVING ENTRAINED ALKALI METAL CYANIDES
FROM FERRO-MANGANESE FURNACE GASES
Filed Feb. 8, 1957
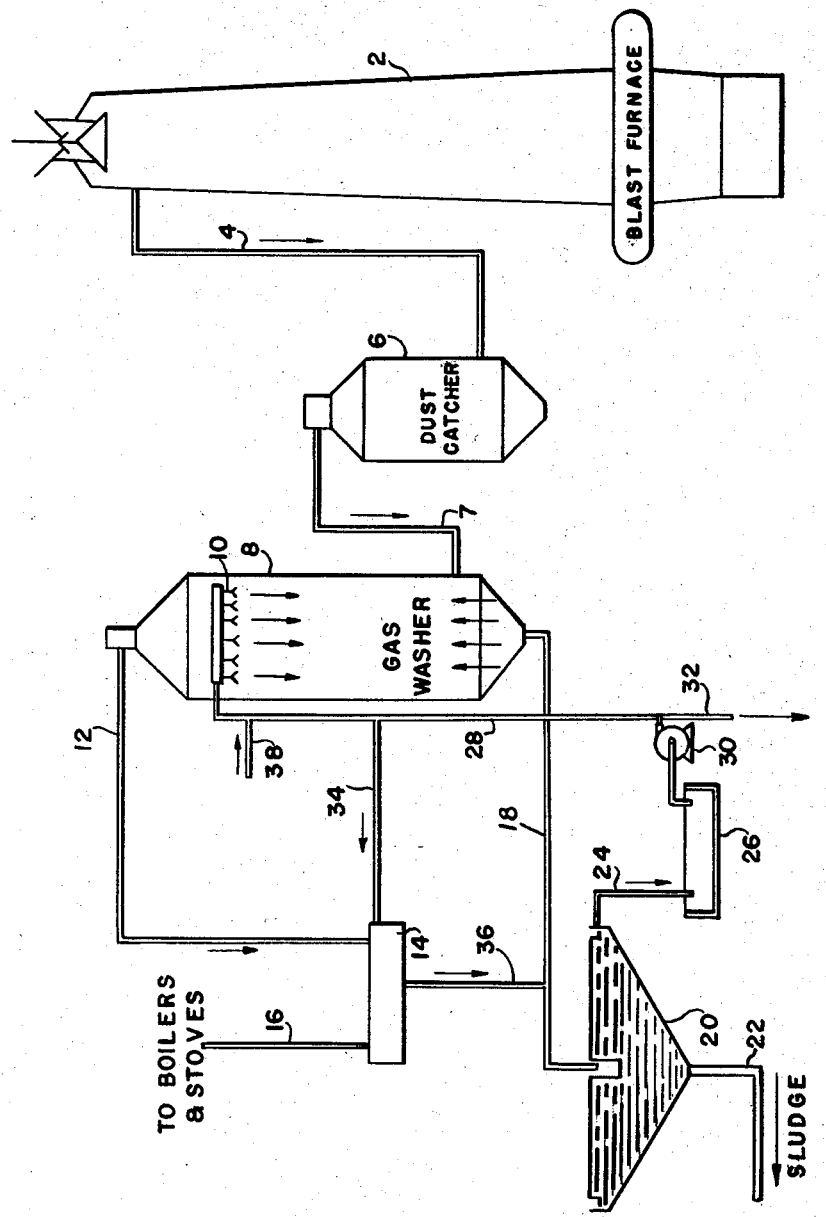
INVENTOR
JOHNSTONE S. MACKAY
BY Cushman, Darby & Cushman
ATTORNEYS

United States Patent Office 2,877,086
Patented Mar. 10, 1959

2,877,086

PROCESS OF REMOVING ENTRAINED ALKALI METAL CYANIDES FROM FERRO-MANGANESE FURNACE GASES

Johnstone S. Mackay, Pittsburgh, Pa., assignor to Pittsburgh Coke & Chemical Company, Pittsburgh, Pa., a corporation of Pennsylvania Application February 8, 1957, Serial No. 639,029

7 Claims. (Cl. 23—2)

This invention relates to the removal of potassium cyanide and other solid cyanides present in the gases from ferro-manganese blast furnaces.

It is an object of the present invention to remove solid cyanides from the gases issuing from ferromanganese blast furnaces in a more efficient and economical manner than has been possible in the past.

A further object is to remove such cyanides without the aid of electrical precipitators.

Another object is to devise a method of converting the solid cyanides to gaseous products which can be readily eliminated along with the other gases normally found in the exit gases from the ferro-manganese blast furnace.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the process for producing ferro-manganese in a conventional blast furnace higher temperatures are required than in iron ore reduction. At the high temperatures present in the ferro-manganese blast furnace cyanides are synthesized from the nitrogen gas and the alkali metal carbides which are also present. The cyanides formed, particularly potassium cyanide, are volatile and the vaporized cyanides are condensed higher in the furnace and carried out in the gas stream as a fine sublimate.

In the past, the solid cyanides have conventionally been disposed of in two ways. First, the solids are removed from the gas by a Cottrell precipitator and then the powders are either burned to destroy the cyanides or alternatively where contamination is not a problem, the solids are washed out with water and disposed of in streams. Both of these procedures are relatively expensive and in areas where the streams must contain potable water the second procedure cannot be used at all.

It is possible to destroy the cyanides in aqueous solution by chlorination in an alkali medium and the effluent then passed into the stream, but the cost of such a procedure is very appreciable.

It has now been found that a large part of the cyanide can be removed by recycling the wash water liquor from the thickener back to the gas washer. Ideally, 100% of the water is recycled. As a practical matter, normally only about 95% of the water from the overflow is recycled. Normally up to 3% of the total water is removed with the sludge and it has been found desirable to recycle 80 to 97% of the total water or to recycle 80 to 99% of the clarified water after sludge removal.

The success of the invention is due at least in part to the fact that the potassium cyanide and similar cyanides are dissolved in the wash water and are then hydrolyzed during the process as the water goes to the settling tank for the removal of solids and the solution of cyanide and other soluble salts is recycled to the washer. The period of contact with the water is important in the hydrolysis product. Of importance also is the lowering in pH accomplished by the recycling. Generally, the lower the pH the greater is the amount of potassium cyanide hydrolyzed to HCN. In a process wherein the wash water is not recycled, the pH of the wash water as it is removed from the system, e. g., by dumping into a stream, is about 9.5. At a pH of 9, potassium cyanide is hydrolyzed to the extent of 65% to HCN, whereas at a pH of 8, the hydrolysis is 95%. The ferro-manganese blast furnace gases which meet the wash water in the gas washer are acidic since they contain $CO_2$. Recycling the wash water permits it to become saturated with $CO_2$. The high $CO_2$ pressure consequently reduces the pH to well below 9 at the top and gas exit of the washer and further increases the hydrolysis of potassium cyanide to HCN. Unlike potassium cyanide which is a solid and quite soluble in water, HCN is a gas and the gas stream moving countercurrently to the water in the gas washer purges the water of the HCN. In addition, the accumulation of $CO_2$ in the water tends to further volatilize the HCN. The above hydrolysis cycle is continuously repeated.

Unlike the problems presented by dumping waste water containing cyanides into streams, there are no problems in getting rid of the volatilized HCN in the exit gases since these gases are burned in the boilers for fuel. In addition, the gas is already dangerous due to CO and HCN does not change the toxicity of the gas in contrast to the dangerous concentration of cyanides normally present in the unrecycled wash water dumped into the stream in other processes.

This procedure is unlike some prior art methods of purifying alkali cyanide containing gases, in which prior art procedures the alkali cyanides are recovered in the dry form with the aid of Cottrell precipitators.

The accompanying drawing shows in semi-diagrammatic form the presently preferred system for removing alkali cyanides from ferro-manganese furnace gases.

Referring to the drawing, 2 is a ferro-manganese blast furnace having a gas take-off pipe 4. The gas is passed through a conventional dry dust catcher 6 and then leaves through pipe 7 and enters gas washer and disintegrator 8 near the bottom thereof. The gas in washer 8 is met by a countercurrent flow of water entering the washer near the top thereof through spray units 10. The washed gas emerges from the top of the washer into pipe 12 from whence it passes through gas cleaning equipment 14 and out through pipe 16 to the boilers and stoves.

The water descends from the sprays 10, picks up cyanides, salts, $CO_2$ and other soluble material from the gases and exits from the gas washer 8 through pipe 18 from which it enters settling tank 20 which preferably is a Dorr thickener. The solids are removed as a sludge through line 22 and are recharged to the furnace. The aqueous liquor flows out through a pipe 24 near the top of the settling tank and then goes to water collection sump 26. From sump 26 the liquor is pumped through line 28 with the aid of recirculating water pump 30. Instead of recirculating all of the aqueous liquor, a small fraction thereof can be bled off through pipe 32 and disposed of in the sewer or is utilized as feed to the blast furnace.

A portion of the recirculating aqueous liquor in pipe 28 is bled off through pipe 34 to the gas cleaning equipment 14 and returns to the settling tank 20 via line 36. Generally, 10 to 25% of the aqueous liquor in pipe 28 is bled off through pipe 34.

As previously stated, it is desirable to remove a small portion, e. g., 5 to 20% of the recirculating liquor through pipe 32. Sufficient fresh water is added to the recirculating aqueous liquor through pipe 38 to make up for the water lost through waste disposal pipe 32, as well as for the small amount of water lost through sludge line 22.

It has been found desirable to limit the amount of water lost through lines 22 and 32 to not more than 20% of the recirculating water.

If the liquor to be disposed of is to be dumped into the sewer, it may be necessary to chlorinate the liquor or otherwise treat the liquor to destroy the hydrogen cyanide therein in the event the sewer enters into a source of potable water or water containing fish. However, only a relatively small amount of chlorination agent is required compared to that employed in conventional processes.

The recycle liquor does not have a chance to cool completely and settles to an equilibrium temperature of from 140 to 170° F. The equilibrium temperature depends to some extent on the outside temperature and the degree of water saturation of the furnace gas.

The relatively high equilibrium temperature acts to decrease the concentration of HCN in the recycle liquor since its vapor pressure is increased. Care should be taken to prevent quick cooling, as in aeration, for example, so that solids do not precipitate in the lines and thereby cause stoppages. Consequently, extra cooling is not normally employed.

*Example*

Employing the system described supra and shown in the drawings, the ferro-manganese blast furnace was set to produce about 300 tons a day of ferro-manganese. The furnace exit gas entering gas take-off pipe 4 was 60,000 S. C. F. M. This gas contained 5.1% $CO_2$, 34.3% CO, 58.7% $N_2$ and 1.9% $H_2$. Entrained with the gas were solids in an amount of about 77 lbs./min. These solids contained 3.5 lbs./min. of cyanide measured as HCN but actually as alkali metal cyanides, chiefly KCN. The solids were washed out of the gas in the gas washer and disintegrator 8 by countercurrent flow of water. A total of 2500 gallons of water/min. flowed through the system. Of this amount, about 2000 gallons/min. were continuously recycled to the gas washer and 400 gallons/min. to gas cleaning equipment 14 or a total of 2400 gallons/min. were recycled in all.

The water at the end of the first cycle through the system contained 168 p. p. m. of cyanide at the Dorr thickener. Upon recycling, the cyanide content rose to an amount which varied between 200 and 300 p. p. m. in the feed to the Dorr thickener.

The solids which settled out in the Dorr thickener and were removed as sludge through line 22 contained 20 to 40 gallons/min. of water. Approximately 70 gallons/min. of water were continuously removed from the system through pipe 32. (The water thus removed can vary from 50 to 500 gallons/min.) The water thus removed was fed to the furnace for cooling purposes. The contact of the water with the cyanide at these high temperatures resulted in the cyanide being largely hydrolyzed to ammonia.

The discharge on occasion was also fed to the Ohio River. The acceptable maximum cyanide content in this river is about 2 p. p. m. To insure sufficient breakdown of the cyanide to non-toxic materials, the discharge was chlorinated before being fed to the river. The chlorine consumption is 5 lbs./lb. of HCN and this amounted to less than 5% of the chlorine required if all of the recycled liquor were so treated.

Make-up water is added through pipe 38 at the same rate at which water is lost from the system and is normally between 50 and 500 gallons/min.

I claim:

1. A continuous process for removing alkali metal cyanides entrained with ferro-manganese furnace gases comprising washing the gases with water, removing the furnace gases from the water, separating the undissolved solids from the solution of the alkali metal cyanides in the water, recycling the cyanide solution to the gas washer, said recycling being repeated at least until a substantial amount of the alkali metal cyanides are hydrolyzed to HCN, and carrying off a substantial proportion of the HCN from the water with the said furnace gases removed from the water.

2. A process according to claim 1 wherein the furnace gases and wash water are in countercurrent flow.

3. A process according to claim 1 wherein 80 to 99% of the clarified water is recycled and make-up water is added to replace the non-recycled water.

4. A process according to claim 3 wherein the furnace gases and wash water are in countercurrent flow.

5. A process according to claim 1 wherein the furnace gases after leaving the gas washer are sent to a gas cleaner and are further washed with recycled water in the gas cleaner.

6. A process according to claim 5 wherein the furnace gases and wash water are in countercurrent flow, 10 to 25% of the recycled water is sent to the gas cleaner and 90 to 75% of the recycled water is sent to the gas washer.

7. A continuous process for removing alkali metal cyanides entrained with ferro-manganese furnace gases consisting essentially of passing the gases through a dust catcher, then washing the gases in countercurrent flow with water, removing the furnace gases from the water, then cleaning the gases with more water and thereafter removing the cleaned gases, combining the gas washing water and the gas cleaning water, separating the undissolved solids from the combined gas washing water and gas cleaning water containing the alkali metal cyanides in solution, recycling about 95% of the cyanide solution to the gas washer and the gas cleaner with about 85% of the recycled water going to the gas washer and about 15% of the recycled water going to the gas cleaner, withdrawing about 5% of the water from the system and adding sufficient fresh water to replace the water withdrawn from the system.

References Cited in the file of this patent

UNITED STATES PATENTS

| | | |
|---|---|---|
| 529,070 | Gredt | Nov. 13, 1894 |

FOREIGN PATENTS

| | | |
|---|---|---|
| 353,184 | Great Britain | July 23, 1931 |